United States Patent [19]

Richard

[11] Patent Number: 4,538,249
[45] Date of Patent: Aug. 27, 1985

[54] ULTRASONIC DOPPLER FISH DETECTOR

[76] Inventor: Joseph D. Richard, 531 S. Navy Blvd., Pensacola, Fla. 32507

[21] Appl. No.: 428,474

[22] Filed: Sep. 29, 1982

[51] Int. Cl.$^3$ .................. A01K 97/12; G08B 21/00
[52] U.S. Cl. .................................. 367/94; 43/17.1; 340/573
[58] Field of Search ............... 340/573, 850; 367/94; 43/17.1, 17

[56] References Cited

U.S. PATENT DOCUMENTS

| | | | |
|---|---|---|---|
| 3,123,798 | 3/1964 | Holloway et al. | 367/94 |
| 3,879,697 | 4/1975 | Richard | 367/94 |
| 4,337,527 | 6/1982 | Delagrange et al. | 367/94 |

Primary Examiner—Glen R. Swann, III

[57] ABSTRACT

A directional Doppler fish movement detector uses a relatively low ultrasonic frequency to minimize particulate scattering and absorption losses in turbid lakes and streams. The low ultrasonic frequency also minimizes Doppler noise caused by boat drift and wave action. To compensate for the relatively low frequency Doppler signals which result, including sub-sonic Doppler signals from slow moving fish, means are provided for doubling, or otherwise multiplying, the frequency of the Doppler signal to improve audibility. Means are also included which allow the relatively wide beam of the Doppler fish movement detector to be directed over a wide horizontal angle, and in one of the preferred configurations, the transducer assembly is attachable to the underwater portion of an electric propulsion motor so that the ultrasonic beam is directed along the line of thrust. Although useful for the detection of normally swimming fish, a preferred use is in cooperation with a fishing effort in which otherwise inactive fish are provoked into impulsive and detectable movements by bait casting into the area covered by the relatively wide ultrasonic beam.

5 Claims, 17 Drawing Figures

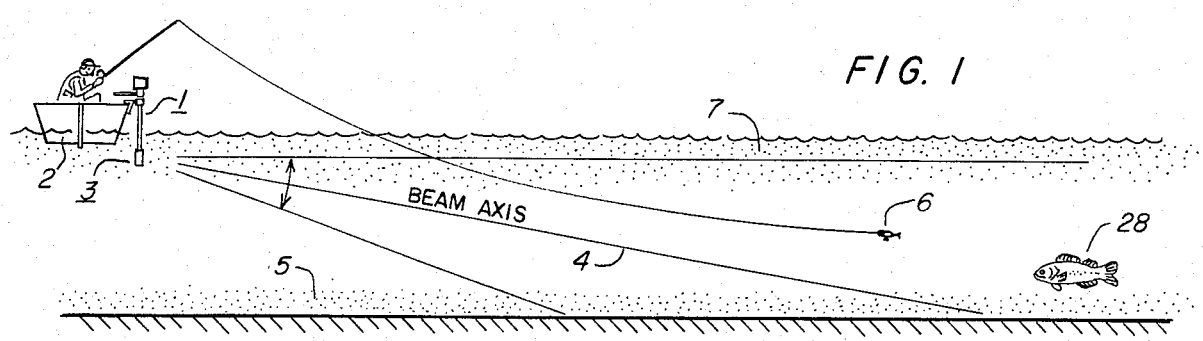
FIG. 1
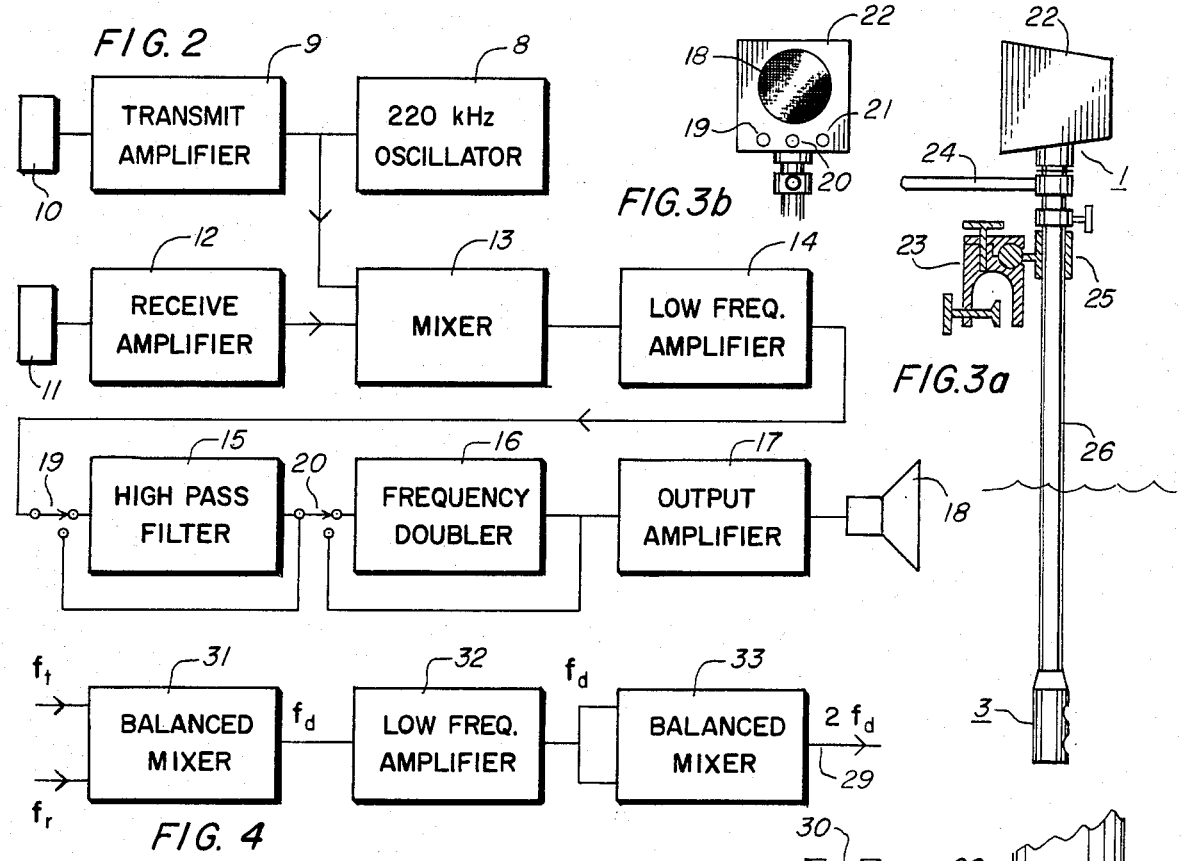
FIG. 2
FIG. 3b
FIG. 3a
FIG. 4
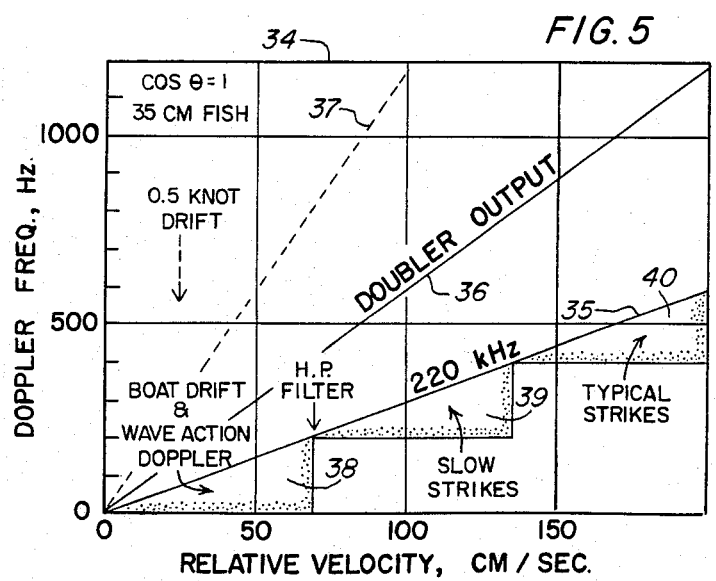
FIG. 5
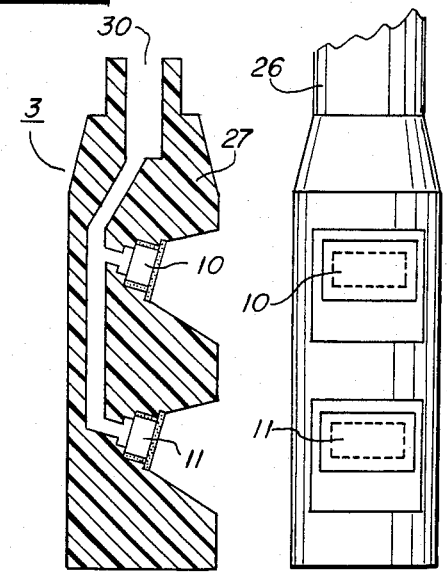
FIG. 3c    FIG. 3d

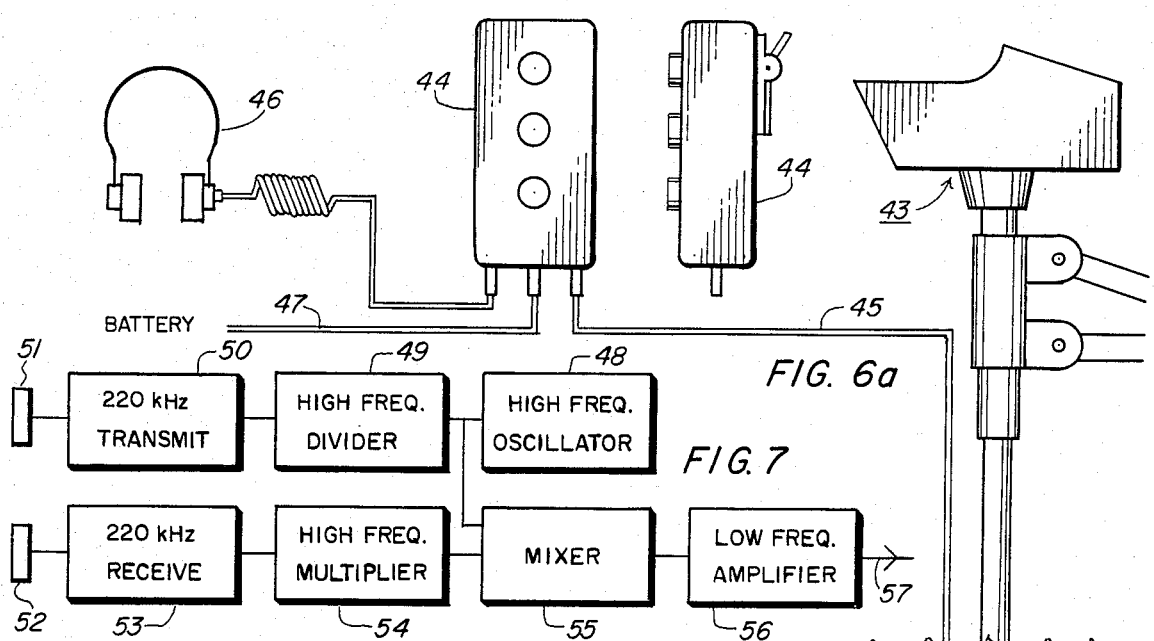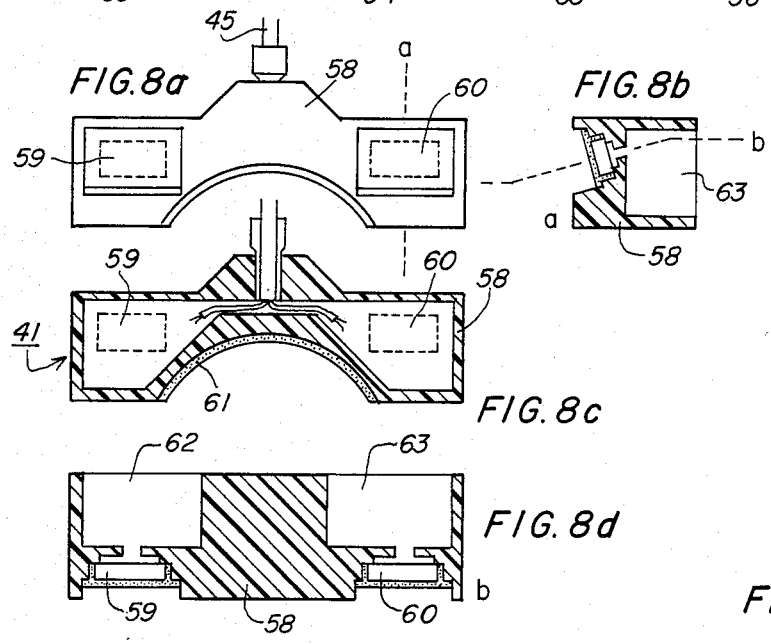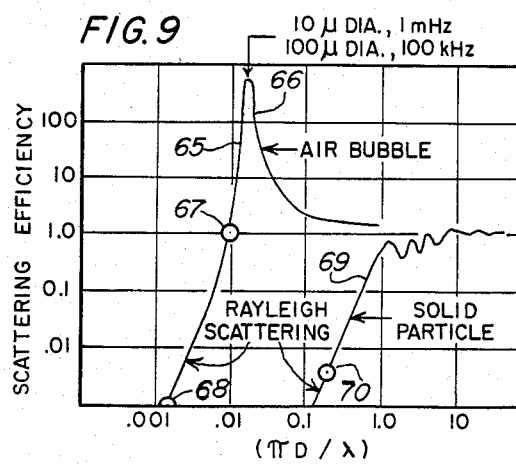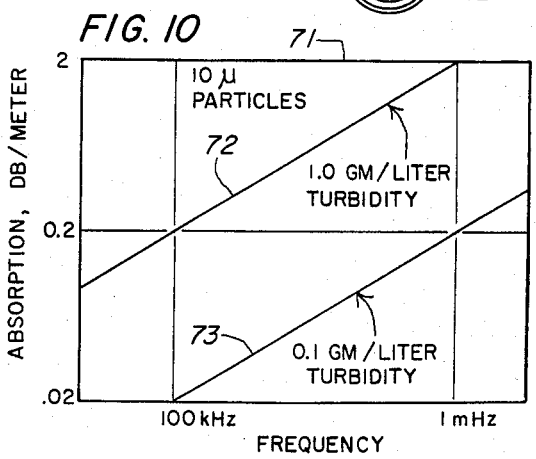

ULTRASONIC DOPPLER FISH DETECTOR

BACKGROUND OF THE INVENTION

1. Field of the Invention

The present invention relates generally to the field of ultrasonic fish detection. More specifically, it relates to a directional ultrasonic Doppler apparatus for detecting actively swimming fish or the impulsive movements of fish responding to a fishing lure or other stimulus introduced into the aquatic environment by a fisherman.

In the past, a wide variety of ultrasonic systems, generally called sonar, have been used for the detection and localization of fish. Usually, pulse echo techniques have been used wherein repetitive pulses of ultrasonic energy are transmitted in a narrow beam into a body of water and the presence of, and distance to, fish or the like are indicated by the amplitude and time delay characteristics of the returning echo. Other sonar systems have employed the continuous transmission of ultrasonic energy, and the detection of fish depends on the frequency changes of the return signal. Some such systems have utilized a continuous transmission Doppler technique. The present invention specifically relates to an improved ultrasonic Doppler apparatus for detecting the movements of fish including, but not limited to, the responses of fish to the presence of an artificially introduced fishing lure.

2. Description of the Prior Art

In the past, two Doppler fish detectors analogous to the present invention were patented and manufactured. Initially, a highly directional Doppler fish detector using an ultrasonic frequency of 800 kHz was manufactured based on U.S. Pat. No. 3,123,798 (Holloway); and later another directional Doppler fish detector, integral with a radio receiver, using an ultrasonic frequency of 1 mHz was manufactured based on U.S. Pat. No. 3,231,852 (Kritz). Although they were both marketed aggressively, these products encountered unforeseen operation problems when used under typical fishing conditions, and the manufacture and sale ended after a very brief period. Since then, almost 20 years ago, no such product has been manufactured or marketed.

The directional Doppler fish detectors of the prior art were both characterized by the use of a relatively high ultrasonic frequency, so that even slowly moving fish would produce an audible (rather than a sub-sonic) Doppler signal. However, this sensitivity to slow movements eventually proved to be a serious detriment under practical fishing conditions. Very strong Doppler signals from the bottom resulted from even relatively slow boat drift (e.g., a 300 Hz Doppler signal was caused by drifting in a 0.5 knot current). Furthermore, surface waves also returned a strong Doppler shifted signal when the beam was directed near the horizontal (e.g., Doppler signals up to around 500 Hz would typically result from even moderate wave action). The consequences of such relative movements, as they pertain to the prior art, are shown graphically by the line 37 in FIG. 5.

However, even more serious problems encountered by the prior art were caused by the very poor transmission characteristics of high frequency ultrasound in scattering and absorbing suspensions such as commonly exist in most lakes and streams. Very high ultrasonic signal attenuation was caused by a combination of: (1) viscous absorption in the water itself of almost 20 dB for a 100 meter (2 way) path, (2) absorption by particulate suspensions which typically resulted in an additional attenuation of 20 to 40 dB under moderately turbid conditions, (3) Rayleigh scattering loss from microbubbles caused by wave action, and (4) resonant scattering loss from microbubbles caused by wave action. The relative absorption and scattering losses of the "high" frequency ultrasound used in the prior art and the "low" frequency ultrasound used in the present invention are compared and discussed in detail with reference to FIGS. 9 and 10.

The object of the present invention is to overcome the serious limitations of the high frequency Doppler fish detectors of the prior art which were found to be virtually inoperative when used in aquatic environments containing even moderate concentrations of particulate suspensions. Since such suspensions commonly occur in most lakes and streams, the manufacture and use of such Doppler fish detectors was discontinued almost 20 years ago. Since then, a need has existed for a low cost, horizontally directed fish detector for bait casting and certain other modes of sport fishing.

SUMMARY OF THE INVENTION

The present invention provides a directional ultrasonic Doppler apparatus for detecting actively swimming fish, or, in a preferred use, for detecting the reactive movements of fish in response to a fishing lure or other stimulus. To overcome the serious limitations of the prior art outlined in the foregoing section, the present invention utilizes a much lower ultrasonic frequency for Doppler fish detection. To compensate for the lower frequency Doppler signals which result (including sub-sonic Doppler signals from slow moving fish), means are provided for doubling, or otherwise multiplying, the frequency of the Doppler signals to improve audibility.

The use of a lower ultrasonic frequency in the present invention greatly reduces the problems of Doppler noise caused by boat drift and wave action, and the improvement over the prior art is shown graphically in FIG. 5. The relatively low ultrasonic frequency has the additional advantage of a correspondingly lower viscous absorption in water, amounting to only about 2 dB over a 100 meter (2 way) path, in comparison with almost 20 dB for the prior art. Most importantly, however, the substantially lower ultrasonic frequency of the present invention avoids the serious absorption and scattering problems (by particle and microbubble suspensions) which caused the higher frequency Doppler fish detectors of the prior art to become virtually inoperable under conditions frequently encountered in most lakes and streams. The pertinent frequency dependent scattering and absorption relationships are shown graphically in FIGS. 9 and 10.

The present invention recognizes that many sport fish, such as black bass, spend much of their time almost motionless. Even in a current, most predatory fresh water fish sought by sport fishermen tend to hold position with reference to the bottom. At other times, particularly during diurnal feeding migrations, such fish swim actively so that they can be detected with a Doppler fish detector. However, motionless and slow moving fish can be provoked to move more rapidly when presented with a suitable stimulus such as those which provoke feeding responses or fright responses. Therefore, a preferred use of the Doppler fish movement detector is in cooperation with a fishing effort in which an artificially presented lure or bait stimulates an impulsive feeding response. For example, one such use includes bait casting for black bass along a shoreline cluttered with vegetation and obstructions which make more conventional fish detection methods useless.

The present invention includes a mechanism for directing the ultrasonic beam of the Doppler fish movement detector toward a chosen fishing area. In one of the preferred embodiments, the transducer assembly is configured for attachment to the submerged portion of an electric motor which then provides the needed directing mechanism in the horizontal plane. Because of the much lower ultrasonic frequency, the Doppler fish movement detector of the present invention is characterized by a much wider beamwidth then the prior art, and this allows coverage of a wider fishing area when bait casting without the need for frequent adjustments of the ultrasonic beam direction. The present invention also provides an optional high pass filter for excluding low frequency Doppler noise caused by boat drift and wave action.

In summary, the present invention has substantially modified old structure and added new structure into a novel combination which overcomes the serious limitations of the prior art. The present invention provides a directional Doppler fish detector which is suitable for use in lakes and streams even under those conditions which rendered the prior art inoperable. The disclosure fills a long felt need (of almost 20 years) for a horizontally directed fish detector which can increase the efficiency of bait casting and certain other fishing methods.

BRIEF DESCRIPTION OF THE DRAWINGS

FIG. 1 shows pictorially the use of a fish movement detector according to the present invention.

FIG. 2 shows a block diagram of a fish movement detector according to the present invention.

FIG. 3a shows a side view of a fish movement detector including means for attachment to a boat gunnel or other platform.

FIG. 3b shows a frontal view of the upper portion of the apparatus shown in FIG. 3a.

FIG. 3c shows a sectional side view of the lower (transducer) portion of the apparatus of FIG. 3a.

FIG. 3d shows a rear view of the lower (transducer) portion of the apparatus of FIG. 3a.

FIG. 4 shows an example of one type of Doppler frequency multiplier usable with the present invention.

FIG. 5 shows graphically the relationship between velocity of moving objects detectable with the fish movement detector and the frequency of the output signals.

FIG. 6a shows another version of a fish movement detector having a transducer assembly attachable to an electric motor.

FIG. 6b shows a frontal view of the lower portion of the apparatus of FIG. 6a.

FIG. 7 shows a block diagram of an alternative type of Doppler frequency multiplier usable with the present invention.

FIG. 8a shows a front view of a transducer assembly specially configured for mounting on the submerged portion of an electric motor.

FIG. 8b shows a sectioned side view of FIG. 8a.
FIG. 8c shows a sectioned front view of FIG. 8a.
FIG. 8d shows a sectioned top view of FIG. 8a.

FIG. 9 shows graphically the relative scattering efficiency of bubbles and solid particles in relation to ultrasonic wavelengths and particle (or bubble) size.

FIG. 10 shows graphically how the absorption of ultrasound in particulate suspensions increases with frequency.

DESCRIPTION OF THE PREFERRED EMBODIMENTS

In FIG. 1, a sport fishing skiff 2 is shown with a fish movement detector 1 attached to the gunnel. The fishing lure 6 has been cast into a body of water exposed to wind and wave action so that microbubbles 7 are shown which have been infused into the surface layer. A particle suspension 5 is also shown which has resulted from turbulent mixing of the bottom sediments and/or the inflow of turbid water from an adjacent land mass. The beam axis 4 of the transducer assembly 3 is oriented toward the area around the fishing lure 6 so that any quickened movements of unseen fish, such as the fish 28 responding to the lure, can be detected.

In FIG. 2, the output of the 220 kHz oscillator 8 is amplified by the transmit amplifier 9 and a corresponding ultrasonic signal is transmitted in a directional beam into the surrounding water by means of the transmitting transducer 10. Ultrasonic signals from the surrounding water resulting from reflections of the transmitted signal are received by the directional receiving transducer 11, and the corresponding electrical signals are amplified by the receive amplifier 12 and mixed with a portion of the oscillator 8 output by the mixer 13. If a reflected signal is received from a moving object in the surrounding water, the return signal will by shifted in frequency because of the Doppler effect, and consequently a difference frequency will be produced by the mixer 13. The difference (Doppler) frequency is amplified by the low frequency amplifier 14. When the switch 19 is closed, the amplified Doppler signal is fed into the high-pass filter 15 which attenuates any signals below the cut-off frequency such as, for example, 200 Hz. Alternatively, the high pass filter 15 can be by-passed with the switch 19. When the switch 20 is closed, the Doppler signal is fed into the frequency doubler 16 which doubles the Doppler frequency. The doubled Doppler frequency signal is amplified by the output amplifier 17 and a corresponding audible acoustic signal is generated by the speaker 18. Alternatively, the frequency doubler 16 can be by-passed with the switch 20 so that the Doppler signal is not multiplied in frequency.

It can be seen that, in comparison with the prior art, a much lower ultrasonic frequency is used in the fish movement detector of the present invention. As a consequence, the basic Doppler circuit of FIG. 2, without the frequency doubler 16 or some other frequency multiplier, cannot indicate the presence of slowly swimming fish with an audible output signal. Unwanted signals such as boat drift and wave action Doppler are also kept below the range of audibility by the use of this low ultrasonic frequency as shown in FIG. 5. However, the most significant advantages of the present invention over the prior art are attributable to the greatly improved propagation characteristics of the relatively low frequency ultrasonic signal when transmitted through naturally occurring scattering and absorbing suspensions as shown in FIGS. 9 and 10.

In FIG. 3a, a fish movement detector 1 is shown including a clamp 23 and ball joint for attachment to the gunnel of a skiff or the like as shown in FIG. 1. The lever 24 is used to rotate the shaft 26 within the support ring 25 so that the transducer assembly 3 can be directed toward a fishing area. The housing 22 contains the Doppler detector of FIG. 2, and the speaker 18, switches 19 and 20, and the sensitivity control 21 are mounted in the front panel as shown in FIG. 3b.

FIG. 3c is a sectioned side view of the transducer assembly 3 showing the transmitting and receiving transducers 10 and 11 mounted within the plastic transducer body 27. Electrical leads (not shown) to the two transducers pass through the opening 30 and up the hollow shaft 26 to the Doppler detector circuit. The beam axes of both transducers are shown depressed about 15° from the horizontal to provide a directional beam similar to that shown in FIG. 1. FIG. 3d shows the transducer assembly attached to the shaft 26 and a face view of the transducers 10 and 11.

FIG. 4 shows one example of a frequency multiplier usable with the Doppler detector of the present invention. The difference frequency (Doppler signal) in the output of the balanced mixer 31 is amplified by the low frequency amplifier 32. The low frequency output from the amplifier 32 is fed into both inputs of the balanced mixer 33 so that sum and difference frequencies will be generated. However, since the difference frequency is zero, only a sum frequency of twice (double) the input frequency is contained in the output signal 29. The theory and use of balanced mixers, including this special application of a balanced mixer as a frequency doubler, are well known to those skilled in the art and so any further description would be only superfluous.

In FIG. 5, the diagram 34 shows the linear relationship 35 between the relative velocity of reflecting targets, such as fish, and the Doppler frequency output from the fish movement detector. The velocity ranges given are typical of a 35 cm fish, and the shaded zones under the line 35 indicate typical ranges of Doppler frequencies produced by such fish and certain other moving reflectors of the transmitted ultrasonic signal. The zone 38 shows the relative velocity range and the corresponding Doppler frequencies typical of slow swimming fish, boat drift, and wave action. If desired, a high-pass filter, such as shown in FIG. 2, can be used to exclude the Doppler signals in this range. The zone 39 shows the velocity range and corresponding Doppler frequencies produced by actively swimming fish or fish striking relatively slowly at a fish lure or the like. Two to four body lengths per second (2 to 4 B.L./sec) is a typical speed range for such moderate activity. The zone 40 shows the velocity range and corresponding Doppler frequencies produced by fast swimming fish and by fish striking more actively at a fish lure. Although a speed range of about 4 to 6 B.L./sec is typical for fish actively striking at a lure, faster speeds ranging from 6 to 10 B.L./sec sometimes occur, and Doppler frequencies produced by such stimulated movements can be visualized by projecting the line 35 in FIG. 5.

For simplicity, only relative movements wherein $\cos \theta = 1$ are depicted by FIG. 5. However, the Doppler frequency is determined by the equation $\Delta f = 2(V) f \cos \theta / c$ where $\theta$ is the angle between the beam axis of the ultrasonic detector and the direction of movement of the reflecting object, and V is the velocity of the reflecting object, f is the ultrasonic frequency, and c is the velocity of sound in water. Obviously, when fish move in random directions, the idealized angular relationship assumed in FIG. 5 occurs only occasionally, so that the actual Doppler frequencies produced by fish movements are almost always substantially lower than those indicated. Since the relatively low ultrasonic frequency used by the fish movement detector (e.g., 220 kHz) can frequently result in sub-sonic Doppler signals from normal fish movements, the present invention provides a means for doubling, or otherwise multiplying, the frequency of the Doppler signal to achieve audibility. For example, in FIG. 5, the line 36 shows the output frequencies of the fish detector as a result of doubling the original Doppler signals to increase audibility.

In contrast to the velocity and Doppler frequency relationship 35 typical of the present invention, the line 37 shows the same relationships typical of the prior art. Slow boat drift of 0.5 knot or even less, and normally encountered wave action both produce strong audible Doppler signals which interfere with fish detection. However, far more serious problems inherent with the high ultrasonic frequencies used in the prior art are caused by excessive absorption and scattering by suspended particles and microbubbles typically present in lakes and streams. FIG. 9 shows the relative scattering and FIG. 10 shows the relative absorption of the ultrasonic signals of the present invention in comparison with those used in the prior art.

In FIG. 6a an ultrasonic Doppler transducer assembly 41 is shown which is specially configured for attachment to the motor housing 42 of an electric motor 43 by means of the strap 74. A waterproof cable 45 connects the transducer assembly 41 to the Doppler detector control box 44. Doppler signals are monitored with the headphones 46. FIG. 6b shows a front view of the motor housing 42 and the transducer assembly 41.

FIG. 7 shows an alternative digital method for multiplying the frequency of the Doppler signals in a fish movement detector according to the present invention. In this method, the high frequency from the oscillator 48 is divided down by the high frequency divider 49 to obtain the relatively low transmit frequency (e.g., 220 kHz) and a corresponding ultrasonic signal is generated by the transmit transducer 51. Reflections of the transmitted ultrasonic signal are received by the receive transducer 52 and the corresponding electrical signals are amplified by the receive amplifier 53. The frequency of the received signal is multiplied by the high frequency multiplier 54 and mixed with the oscillator 48 frequency by the mixer 55. The low difference frequency from the mixer 55 is amplified by the low frequency amplifier 56 and the output 57 can be monitored to detect fish movements according to the present invention. The method shown in FIG. 7, or other digital techniques can be used to multiply the low Doppler frequency signals caused by relatively slow fish movements. Almost any desired multiple can be obtained with such methods. Alternatively, two or more frequency doublers can be used in sequence to obtain higher frequency multiples than the single doubler shown in FIG. 4. For example, two doublers can be used in sequence to quadruple the Doppler frequency.

FIG. 8a shows a front view of a transducer assembly 41 specially configured for mounting on the submerged motor housing of an electric motor as shown in FIG. 6. Transmit transducer 59 and receive transducer 60 are mounted within the plastic body 58. FIG. 8b shows a sectioned side view of the transducer assembly 41 of FIG. 8a showing the transducer axis depressed, for example, 15° from the horizontal. Both transducers are similarly depressed. An optional cavity 63, behind the transducer 60 can contain the receive amplifier and additional components of the Doppler detector circuit. A similar optional cavity 62 behind the transmit transducer 59 can contain the transmit amplifier. Alternatively, all Doppler detector components except for the transducers 59 and 60 can be contained above the surface, for example, in the control box 44 of FIG. 6. FIG. 8c shows a sectional front view of the transducer assembly 41. A soft rubber pad 61 reduces vibration effects from the electric motor housing 42 on which the transducer assembly 41 is mounted. FIG. 8d is a sectioned top view of the transducer assembly 41 showing transmit and receive transducer 59 and 60 mounted within the transducer body 58 in the conventional manner. Connecting leads to the transducers are not shown as such details are so well known by those skilled in the art.

As can be seen from FIG. 8, a preferred embodiment of the fish movement detector utilizes transmit and receive transducers which have a wider beamwidth in the vertical plane than in the horizontal plane. This structure detail reduces the need for added means for directing the axes of the transducer beams in the vertical plane. By mounting the transducers with their beam axes depressed about one-half their vertical beamwidth, as shown in FIG. 1, most fishing activity using the fish movement detector can be conducted without changing the alignment of the beam axes in the vertical plane. For example, a beam depression angle between 10° and 20° can be used for this purpose. Transducer beamwidth is determined by the dimensions of the transducer face, and the vertical beamwidth is about twice the horizontal beamwidth for the transducer face shape shown in FIG. 8. Examples of practical beam widths for the fish movement detector range from 10° to 20° in the horizontal plane and from 20° to 40° in the vertical plane, although narrower or wider beamwidths could be used. In the specific example shown in FIG. 8, the transducer thickness is chosen to resonate at the operating frequency of 220 kHz. The transducer face dimensions are 1 inch wide and ½ inch high to obtain a horizontal beamwidth of 15° and a vertical beamwidth of 30° (as defined by the −6 dB points). As shown in FIG. 8b, the beam depression angle for this example is 15°.

The efficiency by which ultrasound is scattered by air bubbles and solid particles in water as a function of particle (or bubble) dimension and ultrasonic wavelength is shown graphically in FIG. 9. The Rayleigh scattering region of the relationship 65 shows the relative efficiency of air bubbles in scattering "low" frequency ultrasound utilized by the fish movement detector of the present invention in comparison with the "high" frequency ultrasound utilized by Doppler fish detectors of the prior art. To emphasize their relative propagation characteristics through a scattering suspension, a "low" ultrasonic frequency of 100 kHz is compared with a "high" ultrasonic frequency of 1 mHz.

The scattering relationship 69, attributable to solid particles suspended in water, shows that scattering loss is negligable for both 100 kHz and 1 mHz ultrasonic signals because dense (e.g., sediment) particles large enough to scatter such wavelengths efficiently are not to be found in suspension because of their high settling velocity. For example, the point 70 indicates that solid particles of even 100 microns diameter (which would settle out very rapidly) do not scatter 1 mHz ultrasound efficiently, and they scatter 100 kHz ultrasound much less.

However, in contrast to the low scattering efficiency of solid particles in suspension, small air bubbles scatter ultrasound much more efficiently. In FIG. 9, the scattering relationship 65 shows that there is a very large frequency dependence (proportional to $f^4$) in the scattering of ultrasound by small air bubbles in the Rayleigh scattering region. For example, in a naturally occurring population of microbubbles assumed to be smaller than 10 microns diameter, the ultrasonic signal attenuation due to scattering would be over 1000 times greater for a 1 mHz signal than it would be for a 100 kHz signal. As another example shown in FIG. 9, the scattering efficiency of a population of 5 micron air bubbles at 1 mHz is equivalent to the cross section area of the bubble population (scattering efficiency =1) as shown by the point 67. In contrast, the same population of microbubbles would scatter 100 kHz ultrasound with an efficiency of only 0.001 as shown by the point 68.

Resonant scattering by air bubbles in water is shown by the peak 66 in FIG. 9. The efficiency of resonant scattering is almost 1000 times greater than non-resonant scattering. The peak 66 corresponds to a 10 micron bubble scattering 1 mHz ultrasound or to a 100 micron bubble scattering 100 kHz ultrasound. However, 100 micron bubbles cannot persist in water because of their high upward velocity, whereas 10 micron bubbles can persist somewhat to contribute substantially to the total scattering loss of 1 mHz ultrasound.

In essence, FIG. 9 shows that a population of microbubbles, as commonly exists in the upper layer of a body of water exposed to wind and wave action, can render the Doppler fish detectors of the prior art inoperative, while having relatively little effect on the operation of the fish movement detector of the present invention.

Although suspended solid particles do not contribute significantly to the scattering loss of ultrasonic signals over the frequency range shown in FIG. 10, they do absorb ultrasound very considerably, and the absorption increases with frequency. For example, a 0.1 gm/liter suspension of 10 micron particles attenuates a 100 kHz ultrasonic signal by about 0.02 dB/meter, and a 1 mHz ultrasonic signal by about 0.2 dB/meter. When the particle suspension is increased to 1 gm/liter, the attenuation of a 100 kHz signal is still tolerable, while the 1 mHz signal attenuation has increased to a prohibitive 2 dB/meter. This excessive absorption of 800 kHz and 1 mHz ultrasound by suspended particles caused the Doppler fish detectors of the prior art to be inoperative when used in turbid lakes and streams.

Obviously, many alternative constructions and modes of operation could be suggested for the fish movement detector described herein. Although an operating frequency of 220 kHz is suggested in the examples shown, obviously a wide range of ultrasonic frequencies could be used for this purpose. As another alternative, the fish movement detector could include a transducer assembly with an adjustable depression angle so that it could, for example, be directed steeply downward when fishing in deep water. The Doppler detector circuitry can be located either underwater, integral with the transducer assembly, or above the surface in any suitable cabinet or housing. Many types of frequency multipliers are usable with the present invention to increase the Doppler frequency, and the disclosure is not limited to the examples shown which are merely illustrative.

OPERATION OF THE INVENTION

When bait casting along a shoreline, or elsewhere, the relatively broad beam of the Doppler fish movement detector can be directed toward a chosen location before each cast so that any fish movement in response to the lure can be monitored during retrieval. A completed strike produces a bedlam of relatively high-pitched Doppler signals. More importantly, however, any other relatively subtle fish movements in response to the lure are also audible. False starts or aborted strikes can be detected so that the fisherman can try the same location again. Some fish turn quickly and retreat a short distance in response to the splash of the lure on the surface, and such movements are also detectable.

Since actively swimming fish are easily detected with the fish movement detector, another preferred mode of use in saltwater fishing is to monitor the approach of fish from an anchored boat as they move inshore or offshore in the tidal flow during their diurnal feeding migrations. The fish movement detector is useful in many other fishing situations where fish are actively moving or where they can be stimulated to move.

While only certain preferred embodiments are shown and described herein, it is understood that many other modifications are possible and the invention is not limited to the specific structure shown, nor otherwise, except as set forth in the following claims.

What I claim is:

1. An ultrasonic Doppler apparatus for detecting normal fish movements or reactive fish movements in response to a fish lure or other artificial stimulus comprising:

means for directionally transmitting an ultrasonic signal into a body of water, the said transmitted ultrasonic signal having a frequency effective to penetrate particulate suspensions commonly encountered in natural bodies of water;

means for directionally receiving ultrasonic signals from the aforementioned body of water resulting from reflections of the said transmitted signal;

means for deriving a Doppler signal having frequency characteristics dependent on the frequency difference between said transmitted and received ultrasonic signals; means for multiplying the frequency of the said Doppler signal, so that at least some sub-sonic components in the said Doppler signal are made sonic; and electroacoustic means for generating an acoustic output signal having frequency characteristics dependent on the frequency of the said multiplied Doppler signal, the said acoustic signal being an audible indication of the movements of fish, including slow moving fish, in the aforementioned body of water.

2. Apparatus as described in claim 1 wherein:

said means for directionally transmitting and receiving ultrasonic signals are further characterized as having transmitting and receiving ultrasonic transducers combined into a transducer assembly mounted on the lower section of a vertical shaft; and, means for securing an upper section of the said shaft to a fishing boat in an arrangement so disposed that the said shaft can be rotated about its vertical axis to enable the beams of the said transducer assembly to be selectively directed over a wide horizontal angle.

3. Apparatus as described in claim 1 wherein:

said means for directionally transmitting and receiving ultrasonic signals are further characterized as having transmitting and receiving ultrasonic transducers combined into a transducer assembly configured for attachability to an underwater portion of an electric propulsion motor; and means for attaching said transducer assembly to an underwater portion of the aforementioned electric motor to provide a directing mechanism for the said transducer assembly in the horizontal plane.

4. An ultrasonic Doppler apparatus for detecting actively swimming fish or the reactive movements of fish in response to a fishing line or other stimulus comprising:

means for directionally transmitting an ultrasonic signal into a body of water, the said transmitted ultrasonic signal having a frequency effective to penetrate particulate suspensions commonly encountered in natural bodies of water;

means for directionally receiving ultrasonic signals from the aforementioned body of water resulting from reflections of the said transmitted ultrasonic signal, wherein said means for directionally transmitting and receiving ultrasonic signals are further characterized as having transmitting and receiving ultrasonic transducers combined into a transducer assembly configured for attachability to an underwater portion of an electric propulsion motor;

means for attaching said transducer assembly to an underwater portion of the aforementioned electric motor to provide a directing mechanism for the said transducer assembly in the horizontal plane;

means for deriving a Doppler signal having frequency characteristics dependent on the frequency difference between said transmitted and received ultrasonic signals; and electroacoustic means for generating an acoustic output signal having frequency characteristics dependent on the frequency of the said Doppler signal, the said acoustic signal being an indication of the movements of fish in the aforementioned body of water.

5. An ultrasonic Doppler apparatus for detecting actively swimming fish or the reactive movements of fish in response to a fishing lure or other stimulus comprising:

means for directionally transmitting an ultrasonic signal into a body of water, the said transmitted ultrasonic signal having a frequency effective to penetrate particulate suspensions commonly encountered in lakes and streams;

means for directionally receiving ultrasonic signals from the aforementioned body of water resulting from reflections of said transmitted ultrasonic signal, wherein said means for directionally transmitting and receiving ultrasonic signals are further characterized as having transmitting and receiving ultrasonic transducers combined into a transducer assembly configured for attachability to an underwater portion of an electric propulsion motor;

means for attaching said transducer assembly to an underwater portion of the aforementioned electric motor to provide a directing mechanism for the said transducer assembly in the horizontal plane;

means for deriving a Doppler signal having frequency characteristics dependent on the frequency difference between said transmitted and received ultrasonic signals;

high-pass filtering means for attenuating a noise portion of said Doppler signal caused by wave action and drift in the aforementioned body of water; and
electroacoustic means for generating an acoustic output signal having frequency characteristics dependent on the frequency of the said Doppler signal, the said acoustic signal being an indication of the movements of fish in the aforementioned body of water.

* * * * *